(12) United States Patent
Landry et al.

(10) Patent No.: US 8,424,654 B2
(45) Date of Patent: Apr. 23, 2013

(54) WHEELCHAIR SAFETY DEVICE

(76) Inventors: Jean-Marc Landry, Valcourt (CA); Michel Landry, Stoke (CA)

( * ) Notice: Subject to any disclaimer, the term of this patent is extended or adjusted under 35 U.S.C. 154(b) by 295 days.

(21) Appl. No.: 12/803,268

(22) Filed: Jun. 23, 2010

(65) Prior Publication Data

US 2010/0320037 A1 Dec. 23, 2010

(30) Foreign Application Priority Data

Jun. 23, 2009 (CA) ...................................... 2669699

(51) Int. Cl.
*B62B 5/04* (2006.01)
(52) U.S. Cl.
USPC ............................................ 188/2 F; 188/31
(58) Field of Classification Search ................... 188/2 F, 188/17, 31, 19, 20; 280/250.1, 304.1
See application file for complete search history.

(56) References Cited

U.S. PATENT DOCUMENTS

| 5,799,756 | A | * | 9/1998 | Roberts et al. | 188/2 F |
| 5,984,334 | A | * | 11/1999 | Dugas | 188/2 F |
| 6,264,007 | B1 | * | 7/2001 | Norton et al. | 188/2 F |
| 6,341,671 | B1 | * | 1/2002 | Ebersole | 188/2 F |
| 6,484,851 | B2 | * | 11/2002 | Song | 188/31 |

* cited by examiner

*Primary Examiner* — Thomas J Williams
(74) *Attorney, Agent, or Firm* — Eric Fincham

(57) ABSTRACT

A wheelchair safety system for a wheelchair which has a seat and two main wheels, the safety system comprising a first member fixedly secured to one of the wheels and a second member movable between an engaged position and a disengaged position, the disengaged position being one wherein said one of said wheels is free to rotate, an activating assembly which is linked between the seat and the second member, the activating assembly being arranged such that when there is more than a predetermined weight in the seat, the second member is maintained in a disengaged position and when there is less than a predetermined weight in the seat, the second member moves to an engaged position to prevent movement of the wheelchair. The device is useful in preventing accidents when an occupant attempts to rise out of the wheelchair.

7 Claims, 7 Drawing Sheets

WHEELCHAIR SAFETY DEVICE

FIELD OF THE INVENTION

The present application relates to wheelchairs and more particularly, relates to a safety device therefore.

BACKGROUND OF THE INVENTION

The use of wheelchairs is well known and widely practiced. Wheelchairs are normally propelled by the user with the user gripping and pushing on a circular member or hand wheel which is attached to the outside of each rear wheel. Normally, the circular member is of a diameter slightly smaller than that of the wheel. There is a direct connection or drive from the hand wheel(s) to the wheel or wheels of the wheelchair.

Typically, people using wheelchairs can include those of any age who have suffered an injury to the lower body which prevents walking or at least renders the same uncomfortable. Also, a number of elderly people who do not have the requisite leg strength to stand and/or walk use a wheelchair on a regular basis.

Getting into and out of a wheelchair can prove to be a highly risky operation. In order to do either, the wheelchair user should engage a brake on the wheelchair to prevent the wheelchair from moving during the seating or unseating process. New users of wheelchairs and even some people who have used wheelchairs for a period of time occasionally forget to activate the brakes on the wheelchair. When rising, the weight transfer to the arm rest when trying to stand up will often cause the chair to move rearwardly which then puts the person off balance, resulting in a fall. It goes without saying that such falls can be highly dangerous and particularly for people already suffering from an injury and/or disease.

There are wheelchairs which are manufactured and which incorporate devices to prevent the movement of the wheelchair. Such devices can be disadvantageous for differing reasons.

SUMMARY OF THE INVENTION

It is an object of the present invention to provide a safety device which automatically prevents wheelchair movement when the occupant of the wheelchair stands up.

It is a further object of the present invention to provide a safety device for inactivating the wheels of a wheelchair and which device is suitable for using as a retrofit to existing wheelchairs.

It is a still further object of the present invention to provide a method for converting a wheelchair wherein a safety device is suitable for inactivating the wheels of a wheelchair when the user rises.

According to one aspect of the present invention, there is provided a wheelchair safety system for a wheelchair having a seat and two main wheels, the safety system comprising at least one first member fixedly secured to one of the wheels, a second member moveable between an engaged position and a disengaged position, the engaged position being one wherein the second member engages the first member such that the one of the wheels is prevented from rotating, the disengaged position being one wherein the one of the wheels is free to rotate, an activating assembly linked to the seat and the second member, the activating assembly being arranged such that when there is more than a predetermined weight in the seat, the second member is maintained in a disengaged position and when there is less than a predetermined weight in the seat, the second member is in an engaged position, and a locking device mounted rearwardly of the seat, the second locking device comprising a further locking member engageable with the first member, the rear locking member being biased to a non-engaging position.

According to a further aspect of the invention, there is provided a method for improving the safety of a wheelchair having a pair of rear wheels and a seat, the method comprising the steps of installing a first locking member on one of the rear wheels whereby the first locking member rotates with the one of the rear wheels, installing a second locking member adjacent the first locking member, the second locking member being movable between an engaged position and a disengaged position, the engaged position being one wherein the second member engages first member so that one of the rear wheels is prevented from rotating, the disengaged position being one wherein one of the wheels is free to rotate, installing an activating assembly, the activating assembly being linked between the seat and the second locking member, the activating assembly being arranged such that when there is more than a predetermined weight in the seat, the second member is maintained in a disengaged position and when there is less than a predetermined weight in the seat, the second member is in an engaged position.

The safety system of the present invention is designed to be used with most wheelchairs which are commonly available. Such wheelchairs will normally include a pair of rear wheels, each of which has a propulsion ring attached thereto. The propulsion ring is utilized by the occupant of the wheelchair to propel the same along a desired path.

The wheelchair will also include a pair of front wheels which are normally freely pivotable about a vertical access and of a substantially smaller size than the rear wheels. Turning is accomplished by a speed differential between the two rear wheels.

A seat is normally mounted on the framework of the wheelchair and the structure is one which is foldable so that it may be easily transported between objects.

The safety system includes a first member which is secured to one of the rear wheels in a manner such that it will rotate with the rear wheel. A second member is designed to engage the first member to lock the wheel in a fixed position when desired. Normally, this would be when a person has to get out of the wheelchair.

A second member which engages the first member is linked to the seat of the wheelchair. Thus, when a certain weight is present on the seat, the two members do not engage and the occupant is free to move the wheelchair as desired. However, as soon as the occupant attempts to rise from the seat, the two members engage to lock the wheelchair in a fixed position such that it cannot roll away from the occupant.

Preferably, there is included a further locking device which is mounted rearwardly of the seat. This is a manually engageable device such that an attendant may, if desired, lock the wheelchair. This will often be useful when, for example, the occupant is dining at a table.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
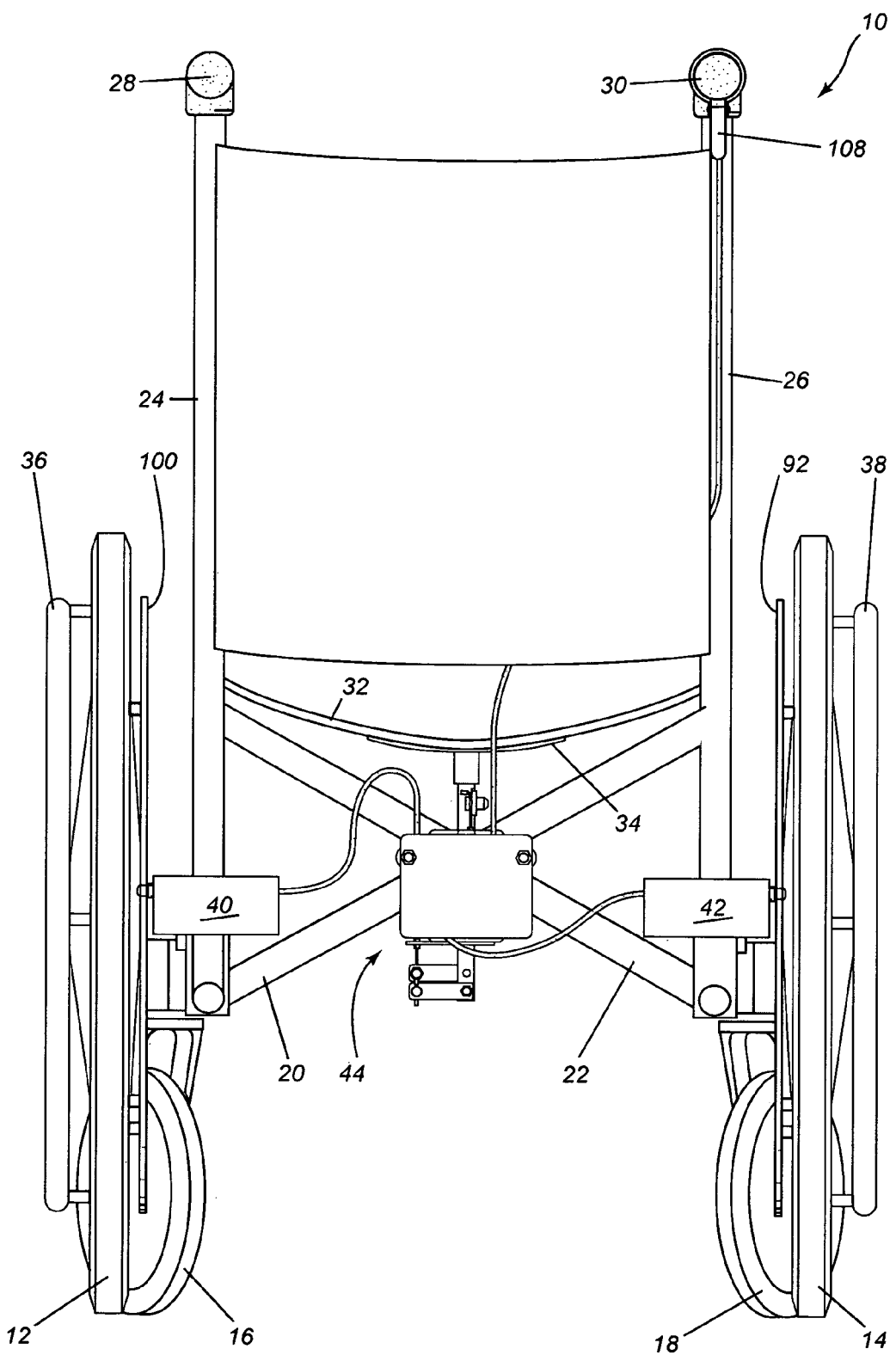
FIG. 1 is a rear elevational view of a wheelchair having the safety system of the present invention.

Referring to the drawings in greater details and by reference characters thereto, there is illustrated a wheelchair which is generally designated by reference numeral 10. Wheelchair 10 may be of a conventional structure and will normally include two main rear wheels 12, 14 and a pair of front wheels 16, 18. Conventionally, front wheels 16, 18 are freely pivotable about a vertical axis.

The structure of the wheelchair 10 includes a pair of diagonal struts 20, 22 and a pair of vertical members 24, 26 having handles 28, 30 extending rearwardly therefrom. This structure is conventional with most wheelchairs.

A seat 32 is mounted on a seat support member 34. Propulsion members 36, 38 are associated with rear wheels 12, 14 respectively, each comprising an annular ring secured to the rear wheels 12, 14 by which means the user may propel the wheelchair.

As seen in FIG. 1, there is a first actuator assembly 40 associated with wheel 12; a second actuator assembly 42 associated with wheel 14 and a central control assembly 44.

Figure 2:
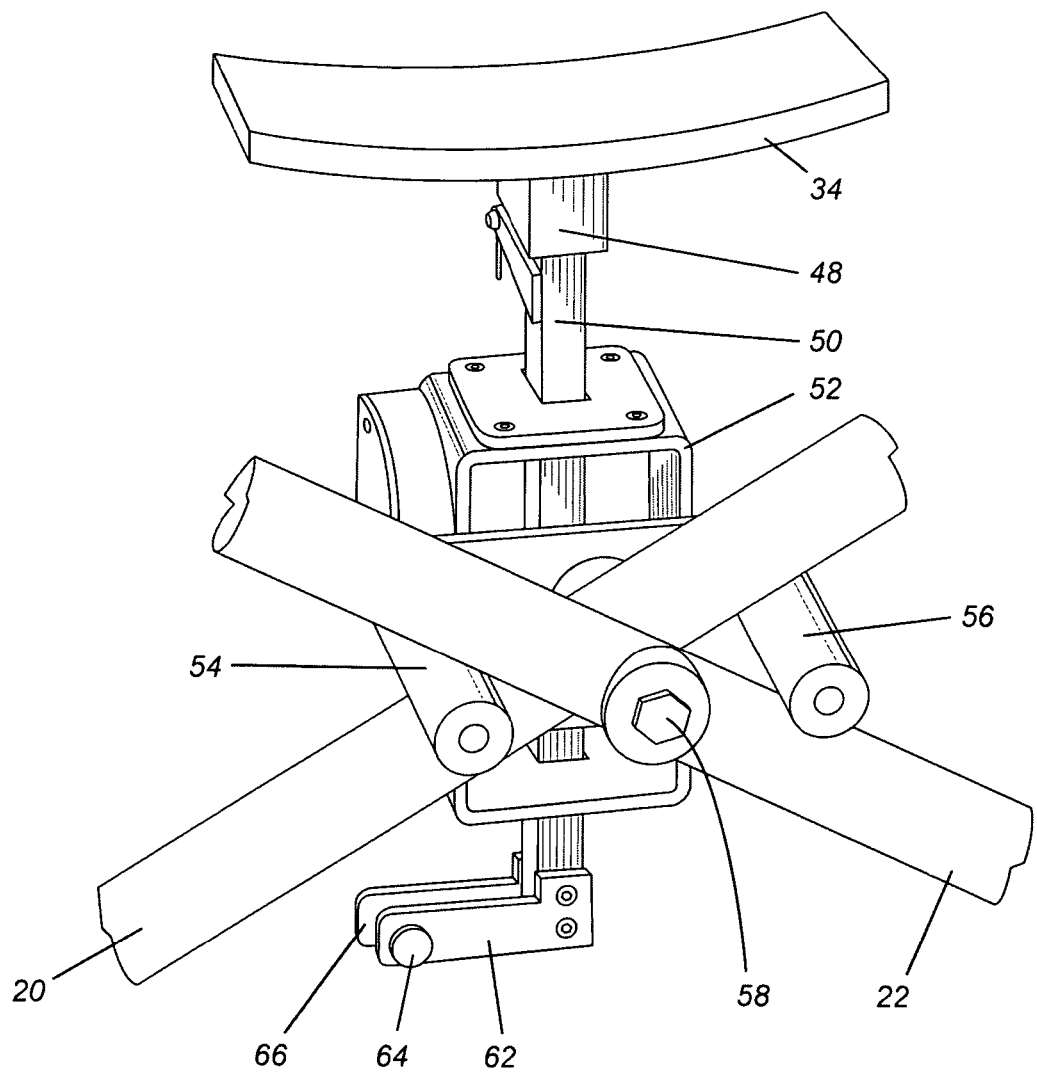
FIG. 2 is a detailed perspective view of the seat support and associated components.
Figure 3:
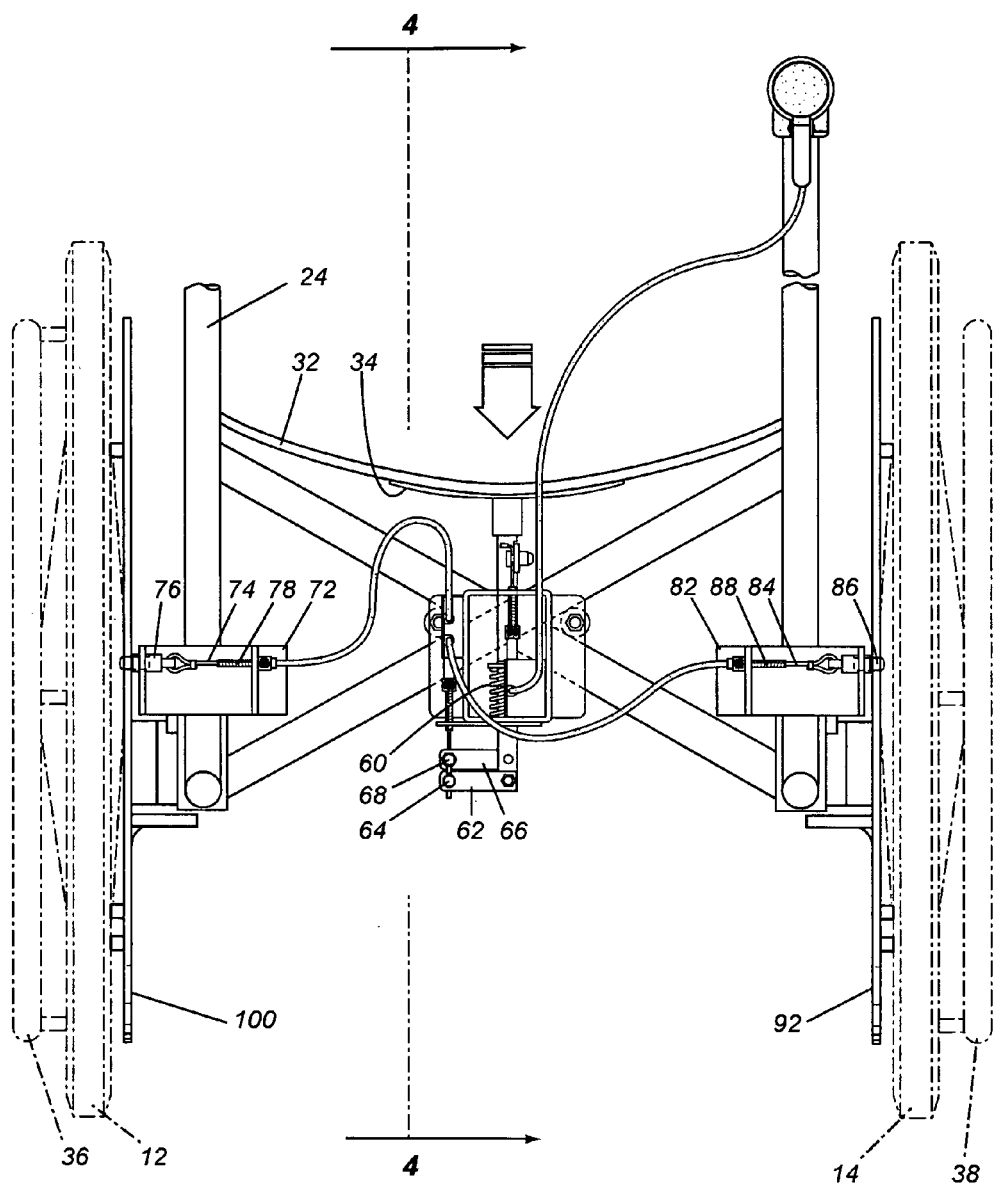
FIG. 3 is a rear cutaway view of the wheelchair and safety system.
Figure 4:
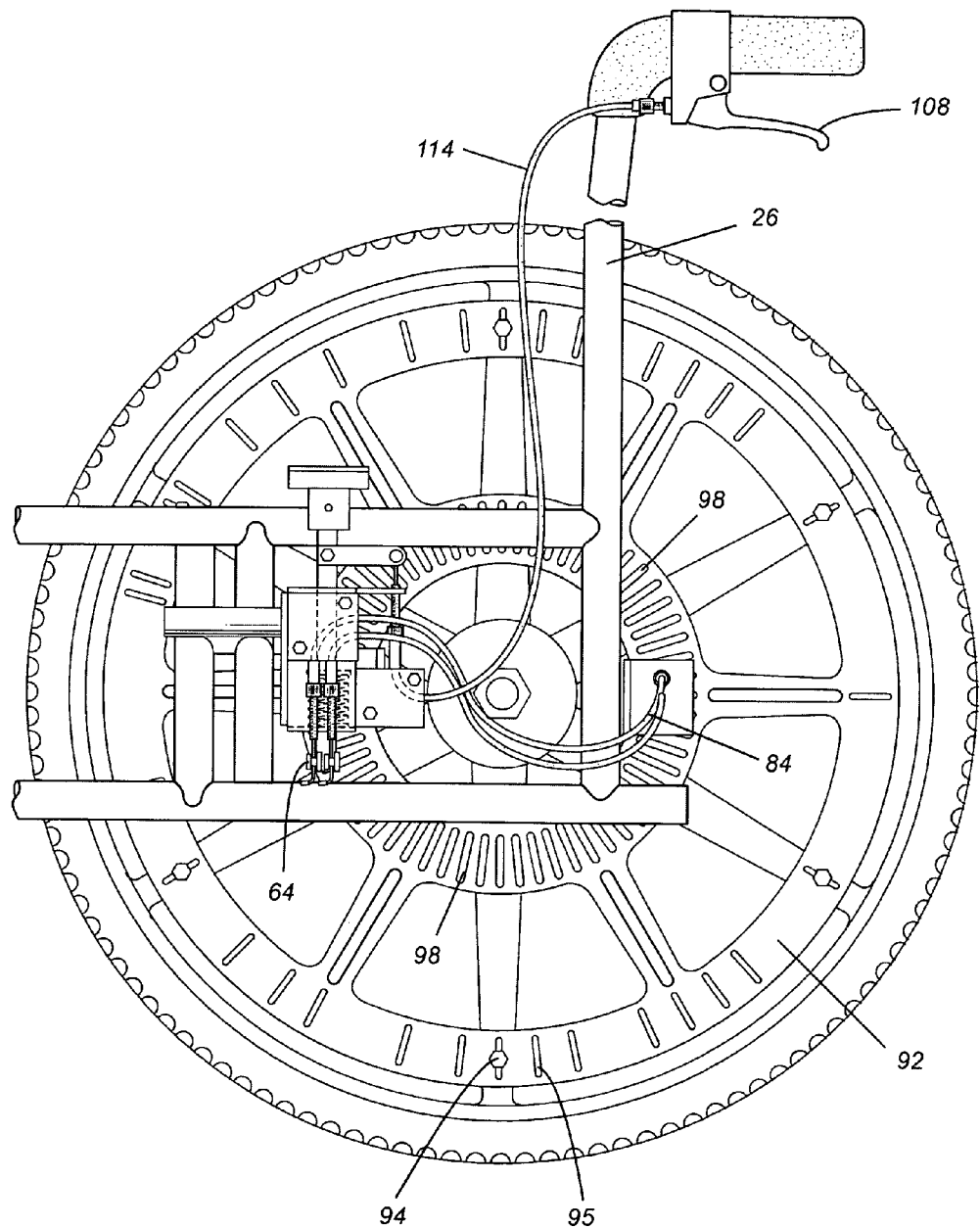
FIG. 4 is a side view taken along the lines 4-4 of FIG. 3.

Referring to FIG. 2, seat support 34 has a bottom portion 48 forming a receptacle or recess to receive a central shaft 50. Shaft 50 passes through a housing 52. A pair of horizontal frame members 54, 56 extend exteriorly of housing 52. Struts 20, 22 are connected by a central bolt 58 to allow pivotable movement of the struts and thus provide a folding capacity to the wheelchair as is known in the art.

A coil spring 60 is centrally located and abuts flange 49 and shaft 50 to thereby bias seat support 34 (and seat 32) upwardly. A first end member 62 is secured to one side of shaft 50 at the lower end thereof. End member 66 includes a locking pin 64 for reasons which will become apparent hereinbelow. Similarly, an end member 66 is located on the opposite side of shaft 50 and also includes a locking pin 68.

Actuator assembly 40 includes a housing 72 and a cable 74. Cable 74 is connected to a pin 76 which is biased outwardly. End cable 74 is attached to pin 76 such that a tension thereon will pull the pin 76 inwardly towards housing 72. Cable 74 extends through a threaded member 79 to central control assembly 44 as will be described in greater detail hereinbelow. Actuator assembly 42 is of a similar structure and includes a housing 82, a cable 84, one end of which is connected to a retractable biased pin 86. A threaded member 88 is provided as in known conventional arrangements.

Figures 5, 6:
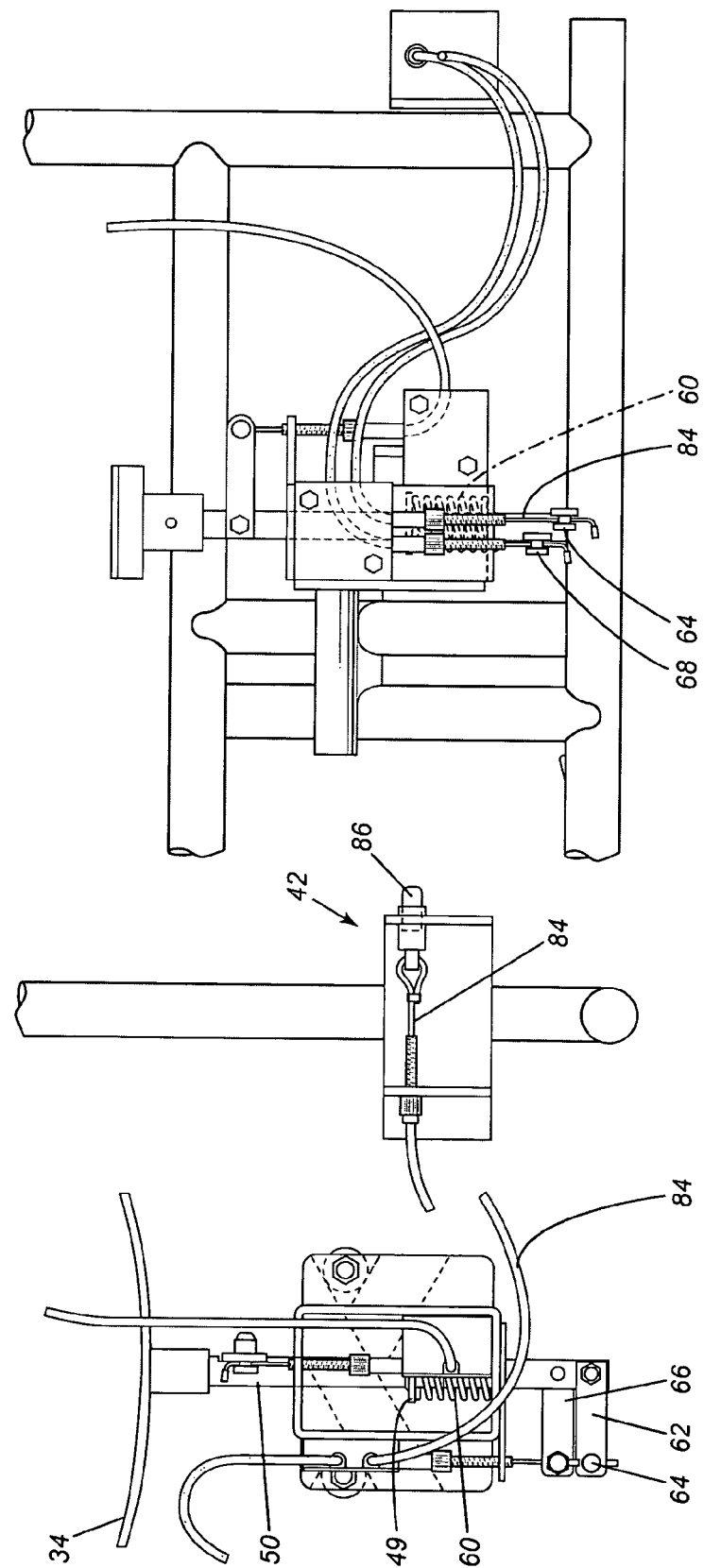
FIG. 5 is a detailed view, partially in cutaway, of the operation of the safety system.
FIG. 6 is a side elevational view thereof.
Figure 7:
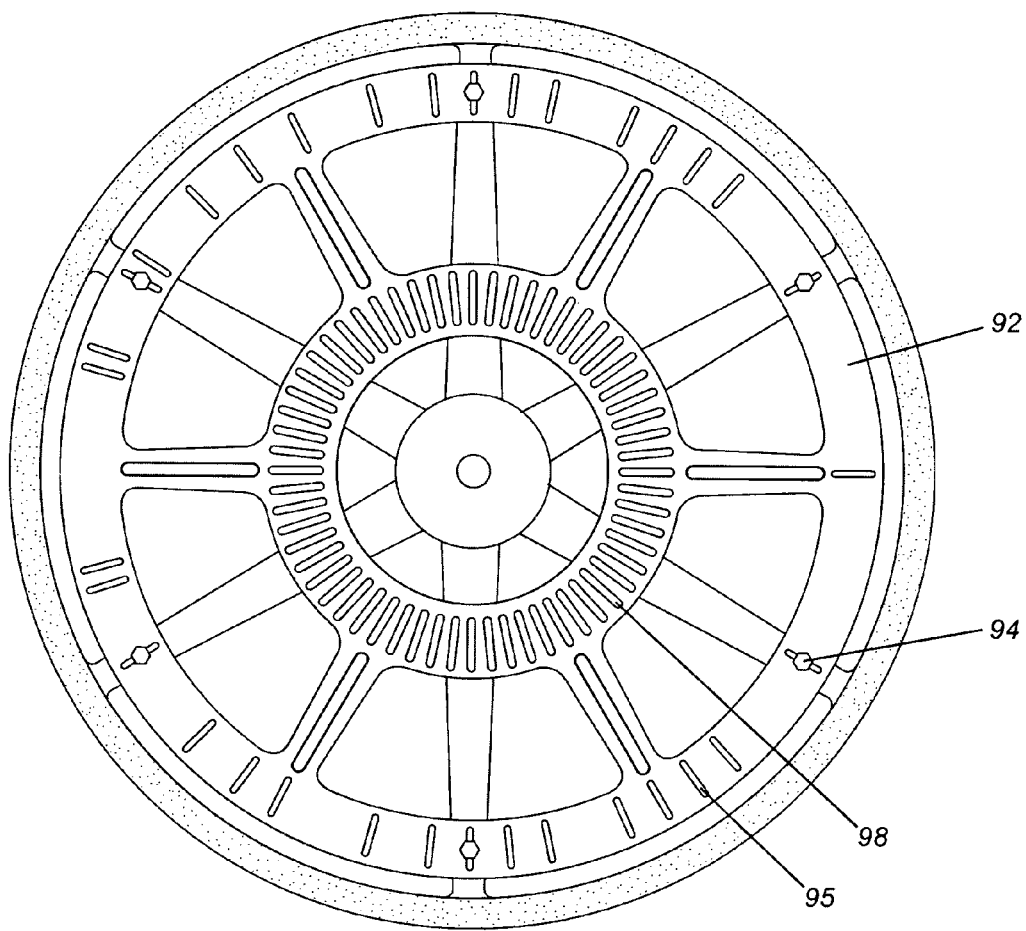
FIG. 7 is a side view of one of the locking members of the safety system.

As may be seen in FIGS. 5 and 6, cables 74 and 84 are connected to pins 66, 64, respectively.

The first member of the locking assembly comprises an inner disc 92 which has screws 94 securing it to the wheel structure through slots 95. Slots 95 are arranged such that the inner disc 92 can be secured to most conventional wheelchair structures. Inner disc 92 has an inner portion thereof 96 which has a plurality of slots 98 designed to receive pin 76 (forming the second member of the locking assembly) to lock the wheel 14 in place. A similar inner disc 100 is provided on wheel 12 and functions in a similar manner with retractable pin 86. In operation, when the seat is occupied, the weight is sufficient to depress seat support 34 and shaft 50 against coil spring 60. This will exert a tension on cables 74 and 84 which will then withdraw pins 76 and 86 respectively from engagement with discs 92 and 100. The wheelchair is then free to be propelled as desired.

When the occupant wishes to get out of the wheelchair, this is normally done by the occupant using his/her hands which are placed on arm rest (not shown). As the occupant rises out of seat 34, this lifts the pressure from shaft 50 and coil spring forces seat support 34 and seat 32 upwardly; cables 74, 84 are then relaxed and this allows pin 76 and 86 to engage in slots 98 of inner disc 92 and with slots (not shown) in inner disc 100.

The safety system is also provided with a supplemental or override braking arrangement. To this end, there is provided a brake handle 108 mounted at pivot point 110 and having a distal end 112. A cable 114 is secured thereto. At its other end, cable 114 is secured thereto. At its other end, cable 114 is secured to a pin member 116 which is similar to pins 76 and 86. Pin 116 is also mounted so as to be engageable with slots 98 in disc 92. Thus, by use of brake handle 108, an attendant may secure the wheelchair in a fixed position when desired. The user of the wheelchair would not be able to override the same.

Figure 8:
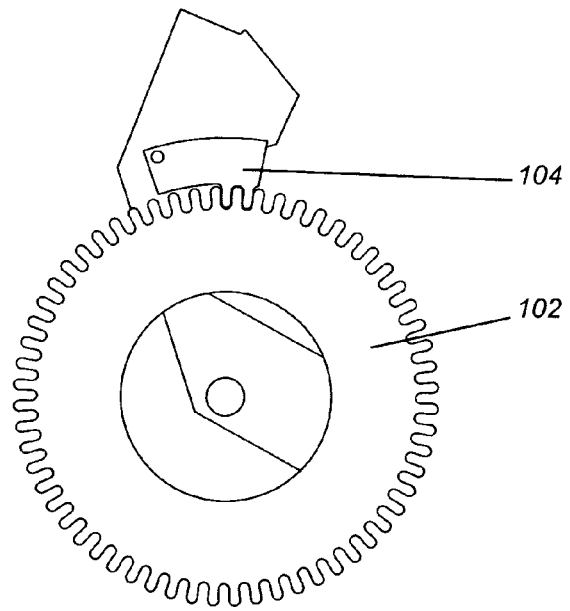
FIG. 8 is a side elevational view of a further embodiment of a locking arrangement.
Figures 9, 10:
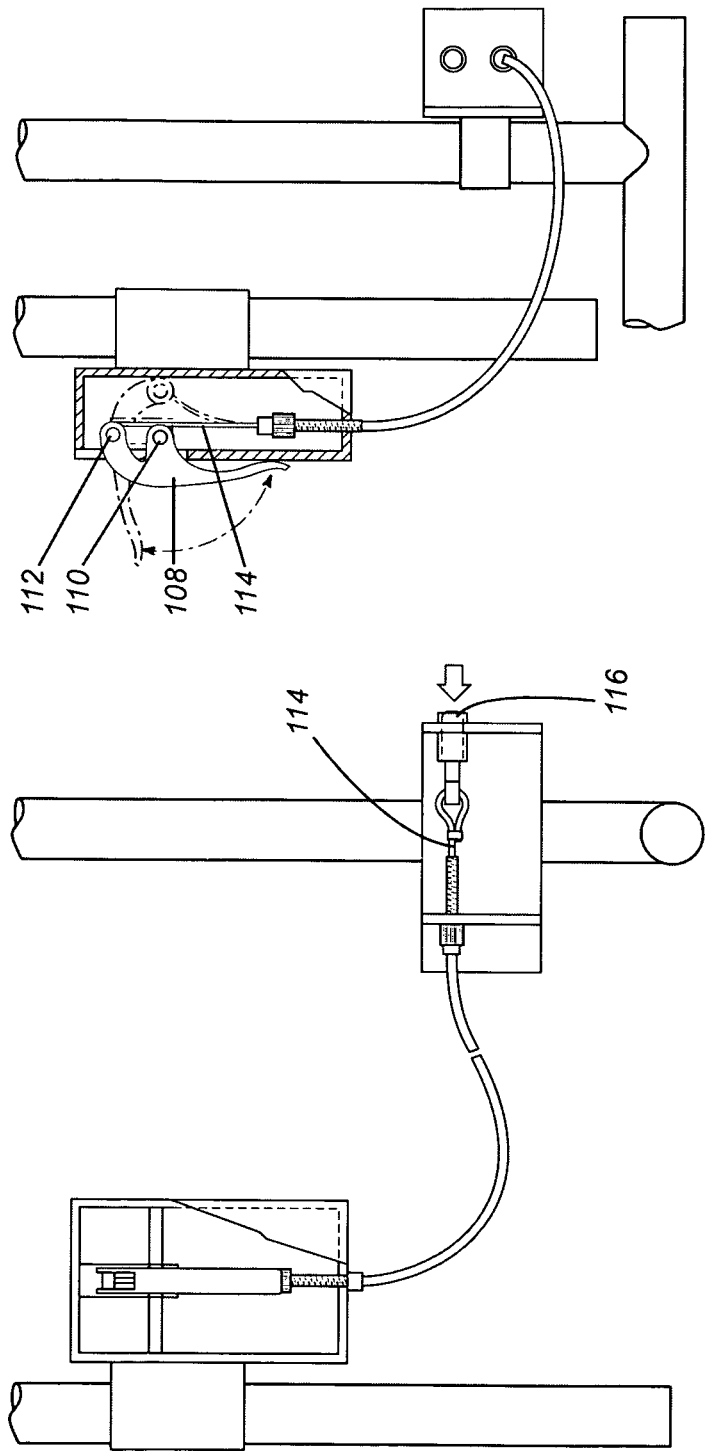
FIG. 9 is a view of the operation of the back-up locking arrangement.
FIG. 10 illustrates the operation of the back-up locking system.

An alternative arrangement to the locking system is illustrated in FIG. 8. In this arrangement, there is provided a tooth member 102 which is securable to the wheel of a wheelchair. A locking member 104 will engage tooth member 102. Similar actuating mechanisms may be utilized.

It will be understood that the above described embodiments are for purposes of illustration only and that changes and modifications may be made thereto without departing from the spirit and scope of the invention

We claim:

1. A wheelchair safety system for a wheelchair having a seat and two main wheels, the safety system comprising:

a first locking device having at least one first member fixedly secured to one of said wheels, said at least one member having a first outer ring, a plurality of slots formed in said first outer ring, said first member having an inner ring, a plurality of slots formed in said inner ring, said first ring being designed to be located adjacent a rim of one of said main wheels for securing said first member to said main wheel;

a second member moveable between an engaged position and a disengaged position, said engaged position being one wherein said second member engages said first member such that said one of said wheels is prevented from rotating, said disengaged position being one wherein said one of said wheels is free to rotate;

an activating assembly linked to said seat and said second member, said activating assembly being arranged such that when there is more than a predetermined weight in said seat, said second member is maintained in a disengaged position and when there is less than a predetermined weight in said seat, said second member is in an engaged position; and a second locking device mounted rearwardly of said seat, said second locking device comprising a further locking member engageable with said first member, said further locking member being biased to a non-engaging position.

2. The safety device of claim 1 wherein said second member comprises a pin member, said first member having apertures formed therein to receive said pin member, when in an engaged position.

3. The safety device of claim 1 wherein said safety system includes a pair of first members, each one of said first members being associated with a respective second member.

4. The safety device of claim 2 wherein said further locking member comprises a pin member engageable with one of said apertures in said first member.

5. The safety device of claim 1 wherein said first member comprises a toothed disc and said second member interlocks with said toothed disc to prevent rotation.

6. The safety device of claim 1 wherein said activating assembly includes a coil spring to bias a seat support upwardly.

7. A method for improving the safety of a wheelchair having a pair of rear wheels and a seat, the method comprising the steps of:

providing a first locking member having a first outer ring, a plurality of slots formed in said first outer ring, said first locking member having an inner ring, a plurality of slots formed in said inner ring, attaching said first locking member to one of said rear wheels of said wheelchair by mechanical fasteners, said mechanical fasteners extending through said slots formed in said outer ring to one of spokes or flange of said rear wheels;

installing a second locking member on said wheelchair adjacent said first locking member, said second locking member being movable between an engaged position and a disengaged position, said engaged position being one wherein said second member engages said first member so that one of said rear wheels is prevented from rotating, said disengaged position being one wherein one of said wheels is free to rotate;

installing an activating assembly, said activating assembly being linked between said seat and said second locking member, said activating assembly being arranged such that when there is more than a predetermined weight in said seat, said second member is maintained in a disengaged position and when there is less than a predetermined weight in said seat, said second member is in an engaged position.

\* \* \* \* \*